United States Patent
John et al.

(10) Patent No.: US 8,849,879 B2
(45) Date of Patent: Sep. 30, 2014

(54) SYSTEM AND METHOD FOR AGGREGATING AND PRESENTING TAGS

(75) Inventors: Ajita John, Holmdel, NJ (US);
Shreeharsh Kelkar, Summit, NJ (US);
Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 567 days.

(21) Appl. No.: 12/848,004

(22) Filed: Jul. 30, 2010

(65) Prior Publication Data
US 2012/0030263 A1 Feb. 2, 2012

(51) Int. Cl.
*G06F 17/30* (2006.01)
(52) U.S. Cl.
CPC ................... *G06F 17/30038* (2013.01)
USPC .......................................................... 707/825
(58) Field of Classification Search
USPC .......................................................... 707/825
See application file for complete search history.

(56) References Cited

U.S. PATENT DOCUMENTS

| 2007/0078832 A1* | 4/2007 | Ott et al. ........................ 707/3 |
| 2009/0204493 A1* | 8/2009 | Kim ............................. 705/14 |
| 2010/0070860 A1* | 3/2010 | Alkov et al. .................. 715/716 |

* cited by examiner

*Primary Examiner* — Khanh Pham
*Assistant Examiner* — Johnese Johnson

(57) ABSTRACT

Disclosed herein are systems, methods, and non-transitory computer-readable storage media for aggregating and presenting tags. A system configured to practice the method identifies a type for each tag describing a media event received from a tagging system, generates aggregate tags representing at least a portion of the set of tags based on the identified types, associates each aggregate tag with the media event based on the at least the portion of the plurality of tags represented by each respective aggregate tag, and optionally outputs the aggregate tags with the media event. A system configured to combine media segments based on aggregated tags first retrieves aggregate tags associated with a media event, receives input from a user, identifies a subset of aggregate tags related to the input, and outputs portions of the media event associated with the subset of aggregate tags.

19 Claims, 9 Drawing Sheets

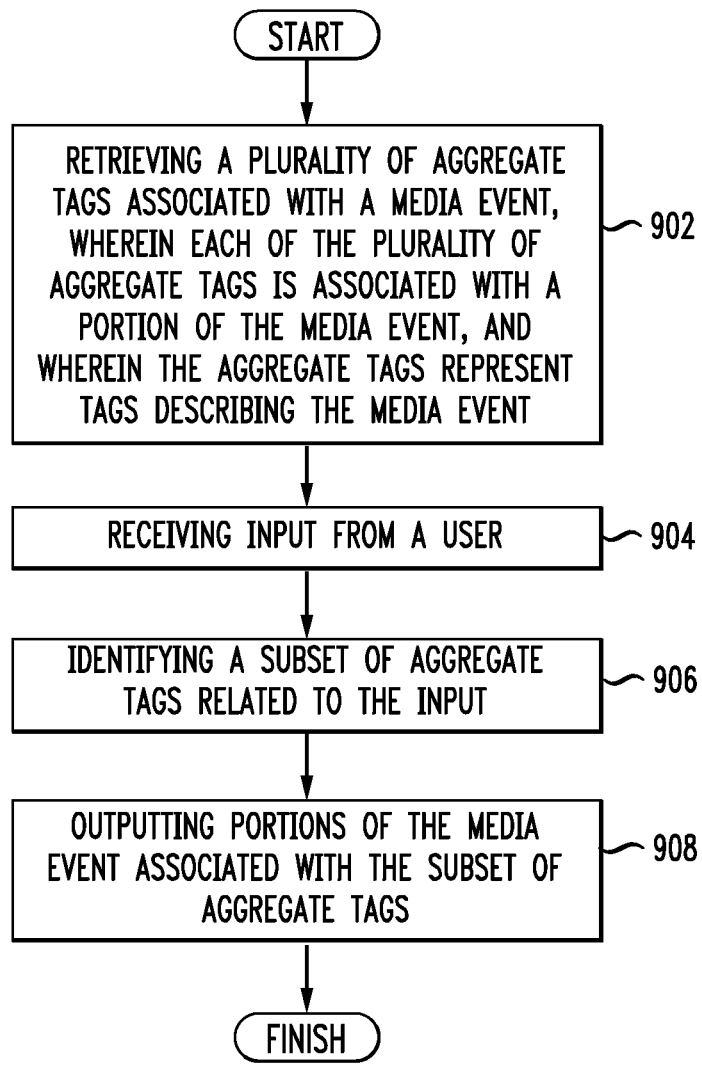

SYSTEM AND METHOD FOR AGGREGATING AND PRESENTING TAGS

BACKGROUND

1. Technical Field

The present disclosure relates to tags of a media event and more specifically to aggregating multiple tags of a media event.

2. Introduction

Multiple users can tag a media event such as a teleconference, video conference, or television broadcast in real time. For example, during a live sporting event, users can tag portions of the game with tags such as "homerun!", "Johnson's first touchdown of the season", "double fault, did you see that?", and "defense!" Over time, however, the number of live tags, or tags that have been created over a live media event, grows higher and higher. Simply displaying the tags as-is can be a source of confusion to users. Tag clouds do not take into account all of the possible variations on how to construct the cloud, why certain words have a bigger font, timing of the tags, and other variables. What is needed in the art is an improved way to display groups of tags in an easily comprehendible way.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As multiple users and automatic sources create tags for media events, the number of tags steadily increases into the hundreds, thousands, or millions. When the number of tags is sufficiently high, simply displaying them as-is can be a source of confusion to the user. The approaches disclosed herein group tags together so that users can more easily comprehend the tags. This approach aggregates tags based on their types. Some example types include "all the segments/instances where Bryan spoke", "all slide transitions", and "all action items in a meeting". The system can aggregate based on more complex relationships of the tags to the content, such as "all tags in the first 10 minutes", "all instant tags nested within a deep tag", "all tags in the last 2 minutes of the game", and "all tags relating to HR". In addition, users can group tags together based on their own criteria such as "all segments I found interesting". The system can aggregate tags based on manually or automatically established policies. A graphical user interface enables the user to select and vary the presentation of aggregated tags during or after the tagging event through input mechanisms like a search field, dial, or slider.

For example, the user may want to first see all the tags in the first 10 minutes aggregated in the normal fashion (number of tags input), then may want to change and view all the tags associated with when Bryan spoke. The system can present all available aggregation policies for selection by the viewer.

The approaches disclosed herein can intelligently string noncontiguous segments of rich media together via aggregation policies and based on live tagging activity from multiple users. These approaches transform live tags of an event into a resource that can be used to combine different segments of rich media via aggregation tagging policies. This disclosure further discloses processing and presenting live tagging activity based on the policies.

Disclosed are systems, methods, and non-transitory computer-readable storage media for aggregating tags, for presenting aggregated tags, and for combining media segments based on aggregated tags. A system practicing the method for aggregating tags first identifies a type for each tag describing a media event of a group of tags describing the media event received from a tagging system to yield identified types. The system generates aggregate tags, wherein each aggregate tag represents at least a portion of the group of tags based on the identified types, and associates each aggregate tag with the media event based on at least the portion of the group of tags represented by each respective aggregate tag. The system can generate the aggregate tags according to an aggregate tag threshold. In one aspect, the media event is in real time, and the system 100 receives tags in real time or in near real time. In another aspect, the media event is a recorded event. The tags can be automatically or manually, such as by multiple humans participating in the media event.

A system practicing the method for presenting aggregated tags first identifies a type for each tag describing a media event of a group of tags describing the media event received from a tagging system to yield identified types. The system generates aggregate tags, wherein each aggregate tag represents at least part of the tags based on the identified types and associates each aggregate tag with the media event based on the at least part of the tags represented by each respective aggregate tag. The system outputs the aggregate tags with the media event, and can optionally output the aggregated tags without the tags received from the tagging system. A user can provide input to refine further the aggregate tags and/or to display additional information about one or more of the aggregate tags. Each tag can include, infer, or link to associated metadata. The system can identify the tag type based at least in part on the associated metadata.

A system practicing the method for combining media segments based on aggregated tags first retrieves a group of aggregate tags associated with a media event, wherein each of the group of aggregate tags is associated with a portion of the media event, and wherein the aggregate tags represent tags describing the media event. The system then receives input from a user and identifies a subset of aggregate tags related to the input. The system outputs portions, which may be non-contiguous, of the media event associated with the subset of aggregate tags. When the system outputs portions of the media event associated with the subset of aggregate tags, the system can further combine the portions of the media event.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9 illustrates an example method embodiment for outputting portions of a media event based on aggregate tags.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for handling large amounts of tags from multiple sources. The disclosure includes a system, method and non-transitory computer-readable media that aggregate and display tags and that combine media segments based on aggregated tags. Aggregated or aggregate tags can also be called summary tags. A basic general-purpose system or computing device in FIG. 1 which can be employed to practice the concepts is disclosed herein. Then the disclosure turns to a discussion of how users and automatic taggers tag events, followed by an example of aggregating multiple tags. The disclosure then discusses exemplary approaches for outputting aggregate tags, followed by a more detailed description of the exemplary methods. The disclosure turns to FIG. 1.

Figure 1:
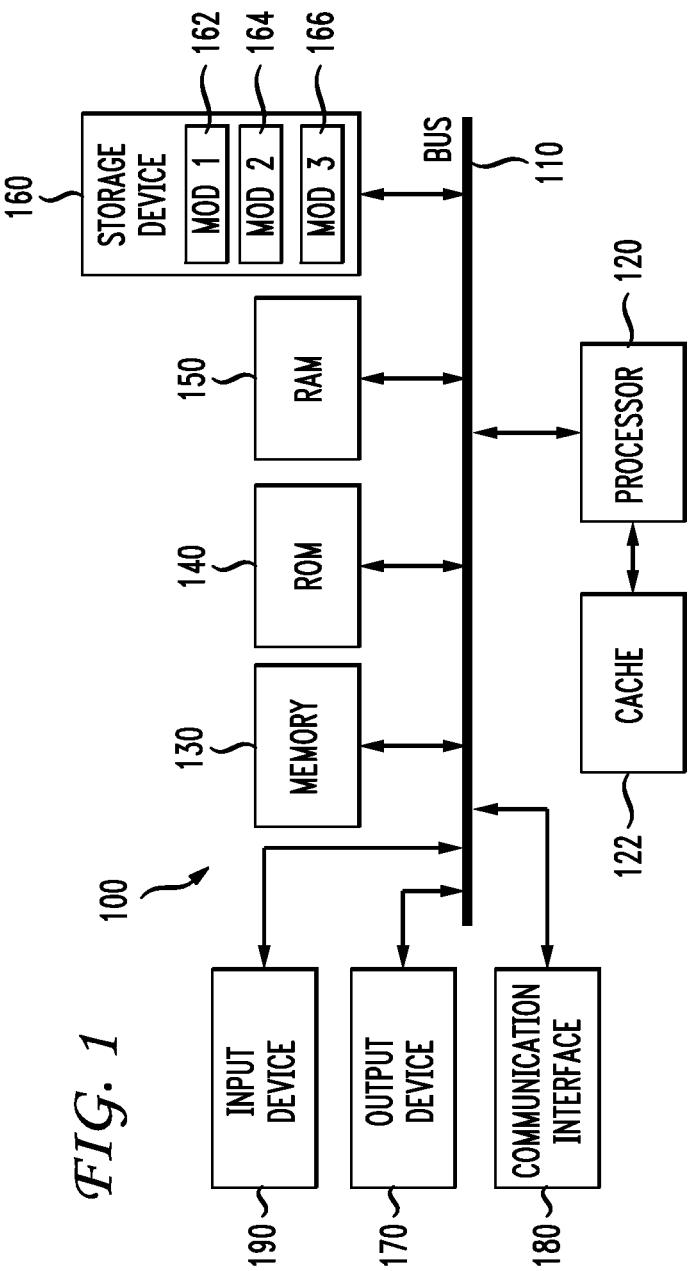
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors (use of the term "processor" should not be construed to refer exclusively to hardware capable of executing software.). Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general-purpose DSP circuit, may also be provided.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 that are modules configured to control the processor 120. These modules may be stored on the storage device 160 and loaded into RAM 150 or memory 130 at runtime or may be stored as would be known in the art in other computer-readable memory locations.

Figure 2:
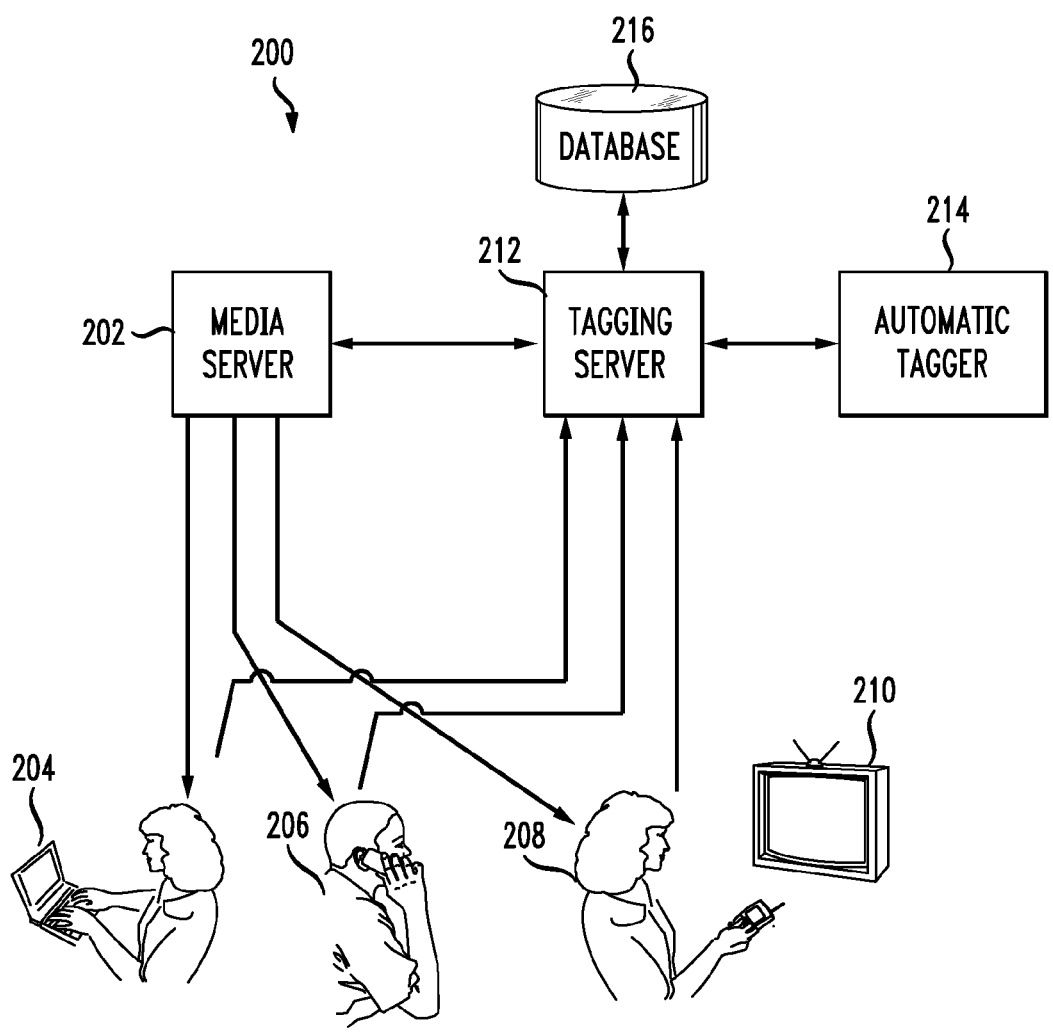
FIG. 2 illustrates an example tagging system configuration.

Having disclosed some basic system components, the disclosure now turns to a discussion of an example tagging, subscription, and notification system configuration 200 as shown in FIG. 2. In this configuration, a media server 202 serves a media event to multiple users 204, 206, 208. However, the media event can be a live event, such as a sporting event, that does not require a media server 202 for live participants, such as the audience in a stadium hosting the sporting event or a live audience of a variety show or a game show. In one variation, a live studio audience provides tags that are combined with tags from broadcast viewers at a later time. The media server 202 can serve the media event to user devices such as television, telephone, smartphone, computer, digital video recorders, and so forth. The media server 202 can deliver the media event via physical media (such as CD or DVD), analog or digital radio broadcast, IP (such as unicast, multicast, anycast, broadcast, or geocast), cable or satellite transmission, and other media delivery approaches.

As users 204, 206, 208 participate in, view, or listen to the media event, the users can provide tags describing the media event. The number of users can be as few as one and can range to hundreds, thousands, or millions, depending on the media event and its audience. For example, if the media event is a sitcom, millions of viewers may be watching (participating) simultaneously. Viewers can tag the sitcom with tags such as "funny joke", "she's going to be really angry", or "theme music". Viewers can provide tags in the form of text, speech, video, images, emoticons, sounds, feelings, gestures, instructions, links, files, indications of yes, no, or maybe, symbols, characters, other forms, and combinations thereof. Further, tags can be unrelated or not directly related to specific content of the media event as presented. For example, users or automatic taggers can tag the media event when something happens offstage, when a breaking news story of an event located appears on cnn.com, when someone off camera does something interesting, when a part of the media event reminds the user of a childhood memory, or when a part of the media event is like another media event.

The system delivers these tags to a tagging server 212 and stored in a database 216. The tags can describe events, persons, objects, dialog, music, or any other aspect of the media event. The tags can further be objective or subjective based on the user's views, feelings, opinions, and reactions to the media event. In one aspect, the media server 202 delivers the media event to one user device 210, such as a television, and the user tags the media event with another device, such as a remote control, smartphone, or a computing tablet. In another aspect, the user tags the media event using the same device that is receiving the media event, such as a personal computer. The tagging server 212 can also store tag metadata in the database 216. Tag metadata describes additional information about the tag, such as which user provided the tag, what portion of the media event the tag applies to, when the tag was created (if the tag is not created during a real time media event), a tag type, and so forth.

The media server 202 can transmit all or part of the media event to an automatic tagger 214. The automatic tagger 214 is a computing device or other system that automatically monitors the media event, human taggers, or other related information sources for particular trigger conditions. The automatic tagger 214 can generate tags based on some attribute such as a particular speaker, clapping, or an advertisement, or based on segments where X percent of user tags contained a keyword, or X number of tags had a high rating, and so forth. When the automatic tagger 214 finds the trigger conditions, the automatic tagger 214 generates a corresponding tag and sends it to the tagging server 212. The trigger conditions can be simple or complex. Some example simple trigger conditions include the beginning of a media event, the ending of a media event, parsing of subtitles to identify key words, and so forth. Some example complex trigger conditions include detecting speaker changes, detecting scene changes, detecting commercials, detecting a goal in a soccer game, identifying a song playing in the background, and so forth.

In one variation, the automatic tagger 214 further annotates or otherwise enhances human-generated tags. For example, if a user enters a tag having a typographical error, the automatic tagger 214 can correct the typographical error. In another example, if the user is in view of a camera, the automatic tagger can perform facial recognition of a user at the time he or she is entering a tag. The automatic tagger 214 can infer an emotional state of the user at that time based on the facial expressions the user is making. For example, if the user grimaces as he enters a tag, the automatic tagger 214 can include "disgusted emotional state" metadata to the entered tag. If the user is giggling as she enters a tag, the automatic tagger can include "humorous" metadata to the entered tag as well as a confidence score in the metadata. For example, if the user produces a modest giggle, the confidence score can be low, whereas if the user produces a loud, prolonged guffaw, the confidence score can be high. The automatic tagger 214 can also analyze body language, body position, eye orientation, speech uttered to other users while entering a tag, and so forth. In this aspect, the automatic tagger 214 can be a distributed network of sensors that detect source information about users entering tags and update the entered tags and/or their metadata accordingly.

The automatic tagger 214 can process one or more media events. The automatic tagger 214 can also provide tag metadata to the tagging server 212. The tagging server 212, the media server 202, and/or the automatic tagger 214 can be wholly or partially integrated or can be entirely separate systems.

A user tags a media event such as a teleconference, video conference, or television broadcast in real time. Other participants also tag the same media event in real time. The system can apply certain tags based on events from the media server. For example, during a live meeting, participants or an automated system manually tag portions of the meeting with tags such as "Bryan talking about new inventions", "Q&A session", "silence", or "slide 4". In addition, the system can apply automatically generated tags like "recording started", "Mark has joined the conference", "Bryan is speaking", or "Bryan has left the conference" based on events from the media server. Rich media often encapsulates many types of events. Thus, these tags can be of different types (speaker turns, join/drop events, action items, questions, or slide transitions) which the users can specify or the system can infer. In addition, tags can be whole tags that attach to the whole event, deep tags that attach to segments of the event, and instant tags that attach to the event at a particular point in time. The system can tie together non-contiguous segments of a media presentation based on various aggregation policies. In one embodiment, the system applies algorithms to determine an appropriate starting time and ending time of a cluster of instant tags in order to convert the cluster of instant tags into a deep aggregate tag and/or associated segment with start and stop indices.

A tagging aggregation system combines tags that occur throughout different portions of the tagged event. For example, aggregating tags based on "all slide transitions" causes tags to be aggregated that occurred two minutes into the program (the first transition), and then tags 10 minutes later (the next transition), and so forth. In many instances when the system aggregates tags in these ways, the live timeframe in which the tagging occurs according to the event is non-contiguous in the overall timeframe of the media event. In another example, tags aggregated based on every time Phil Mickelson tees off in the tournament occur periodically throughout the media event, but not at a specific fixed time interval.

In another variation, the system presents, as part of the live programming, aggregation policies that are currently being applied to tags received at the moment. For example, 5 seconds before a slide transition, an icon or text can appear stating "Slide Transition Tagging Policy" along with others such as "Tags in the first 10 minutes Policy". Then 20 seconds after that slide transition, the "Slide Transition Tagging Policy" notification disappears because now the time period associated with the transition has passed and any new tags received will not be associated with the aggregation policy. This can help live taggers to know how the system is receiving and processing their tags. Thus, certain tags can be associated with multiple aggregate tags and can have multiple types. For example, if, 10 seconds after a slide transition, a user wants to provide a tag for the content of the new slide but does not want that tag to be processed under a slide transition aggregation policy, he can choose to wait to provide the tag until the icon or text indicating "Slide Transition Tagging Policy" disappears or he can choose to click a button or provide other input that dissociates his tag from the "Slide Transition Tagging Policy".

Figure 3:
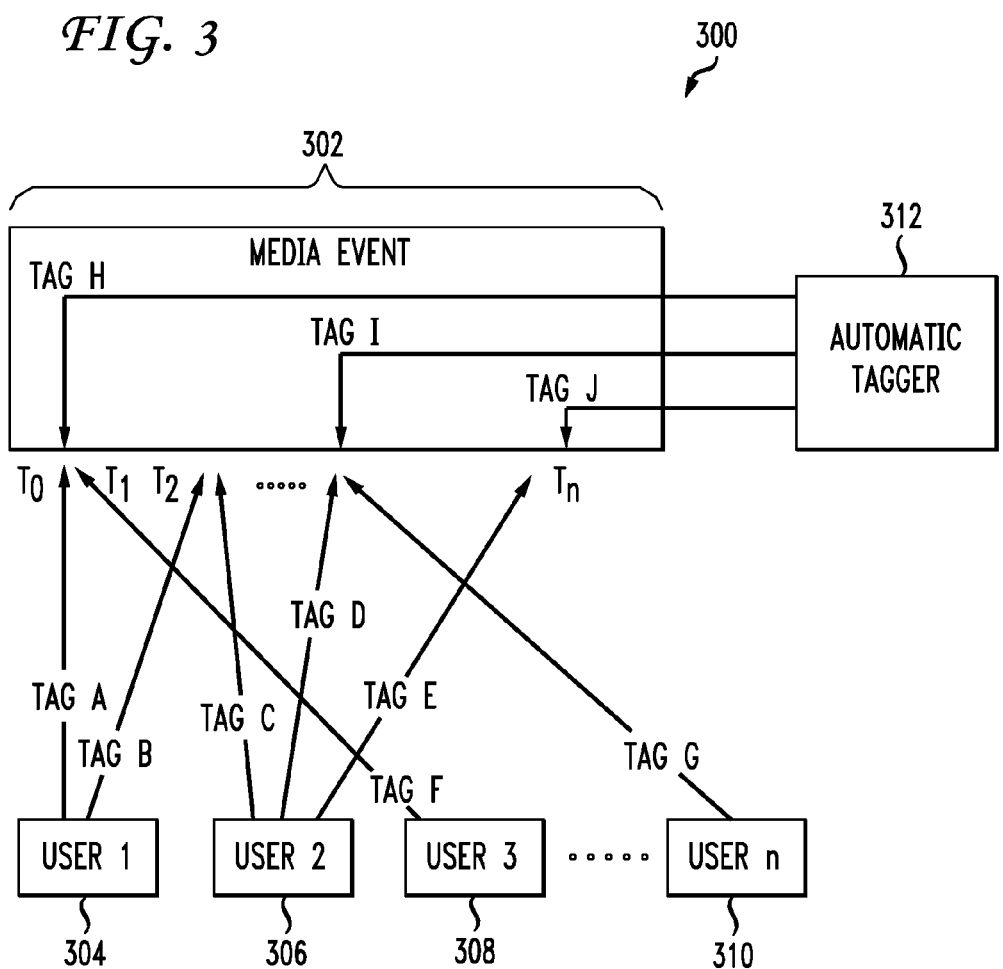
FIG. 3 illustrates an example of users tagging a media event.

FIG. 3 illustrates an example scenario 300 of users tagging a media event 302. The media event 302 can be a television broadcast, a conference call, a video call, a live event (such as a play or a sporting event), and so forth. The media event 302 can be recorded or in real time. Users 304, 306, 308, 310 participate in or view the media event 302 starting at a time $T_0$ and moving forward in time to time $T_1$, $T_2$, ... $T_n$. Users submit tags via a separate device or via the same device that is displaying the media event 302. For example, a user in a sports stadium can tag via a cellular phone, while a user viewing a web conference on a laptop computer can tag via the laptop computer. In this example, User 1 304 submits tag A between time $T_0$ and $T_1$, and submits tag B just before time $T_2$. User 2 306 submits tag C just after time $T_2$, submits tag D for an exciting part of the media event 302, and submits tag E for a later portion of the media event 302. User 3 308 submits tag F at or around the same time as tag A. User n 310 submits tag G at the same time as tag D. The users can be in a same physical location or they can be spatially distant one from another. An automatic tagger 312 also tags the media event 302. The automatic tagger 312 submits tag H at or around the same time as tags A and F. The automatic tagger submits tag I at the same time as tags D and G. The automatic tagger also submits tag J at time $T_n$, or the end of the media event 312. Users and the automatic tagger can submit tags in real time or later as a recorded version of the media event 302 is played back. For example, the automatic tagger 312 may be too busy to process the media event 302 in real time and can review the recorded media event later when suitable processing power is available.

Figure 4:
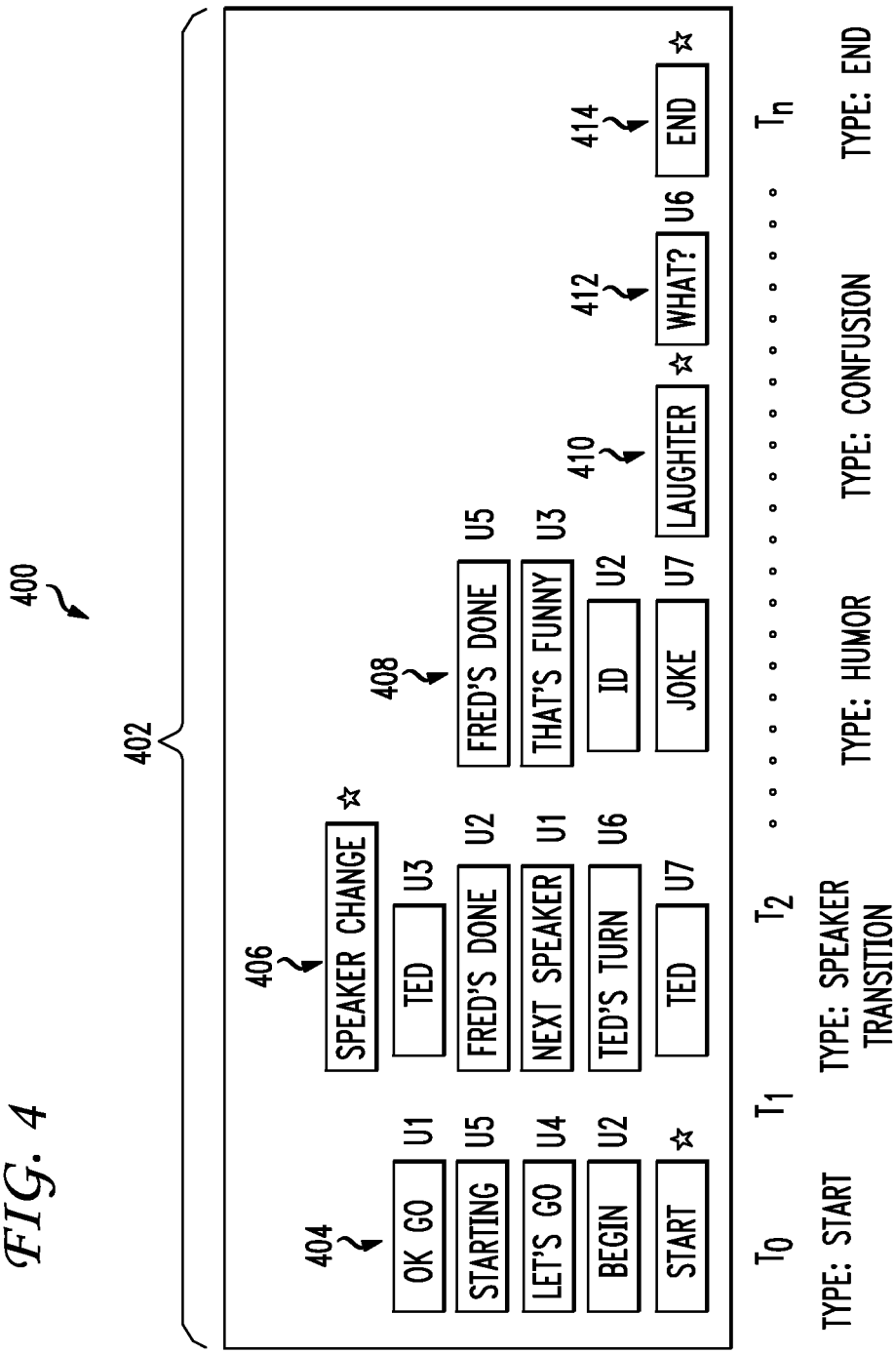
FIG. 4 illustrates an example media event overlaid with tags from multiple users.

Having discussed how users and automatic taggers provide tags associated with a media event, the disclosure now turns to a discussion of how to process received tags. FIG. 4 illustrates an example set of tags 400 from multiple users for a media event 402. Tags can include metadata such as the source of the tag. In this example, starred tags represent automatically generated tags, and the other tags include an annotation such as U1, U2, and U3 indicating which user provided that tag. In this media event 402, the first set of tags 404 is of type "start" and can include individual tags such as "OK, go", "starting", "let's go", "begin", and "start". The second set of tags 406 is of type "speaker transition" and can include individual tags such as "speaker change", "Ted", "Fred's done", "Next speaker", "Ted's Turn", and "Ted". While all of these tags are of the same type, only two are the exact same text. In some cases, none of the tags of a same type shares the exact same text. The third set of tags 408 is of type "humor" and can include individual tags such as "CD", "that's funny", "lol", and "joke". Tags can include text, symbols, colors, links, images, video, and other information. The third set of tags 408 can include an outlier tag "laughter" 410 that is nearby but at a later time than the other tags. In this case, the "laughter" tag is starred, meaning that it was automatically generated. In this case, users can tag the humorous portion of the media event and shortly thereafter, the system automatically detects the laughter in response to the humorous portion and inserts the "laughter" tag 410.

In some cases, an individual tag appears without others of a similar type around it. In this case, the tag "what?" 412 is of type "confusion" and no similar tags appear in the temporal vicinity. Similarly, the automatically generated tag "end" 414 is of type "end" and no tags of a similar type appear nearby.

Figure 5:
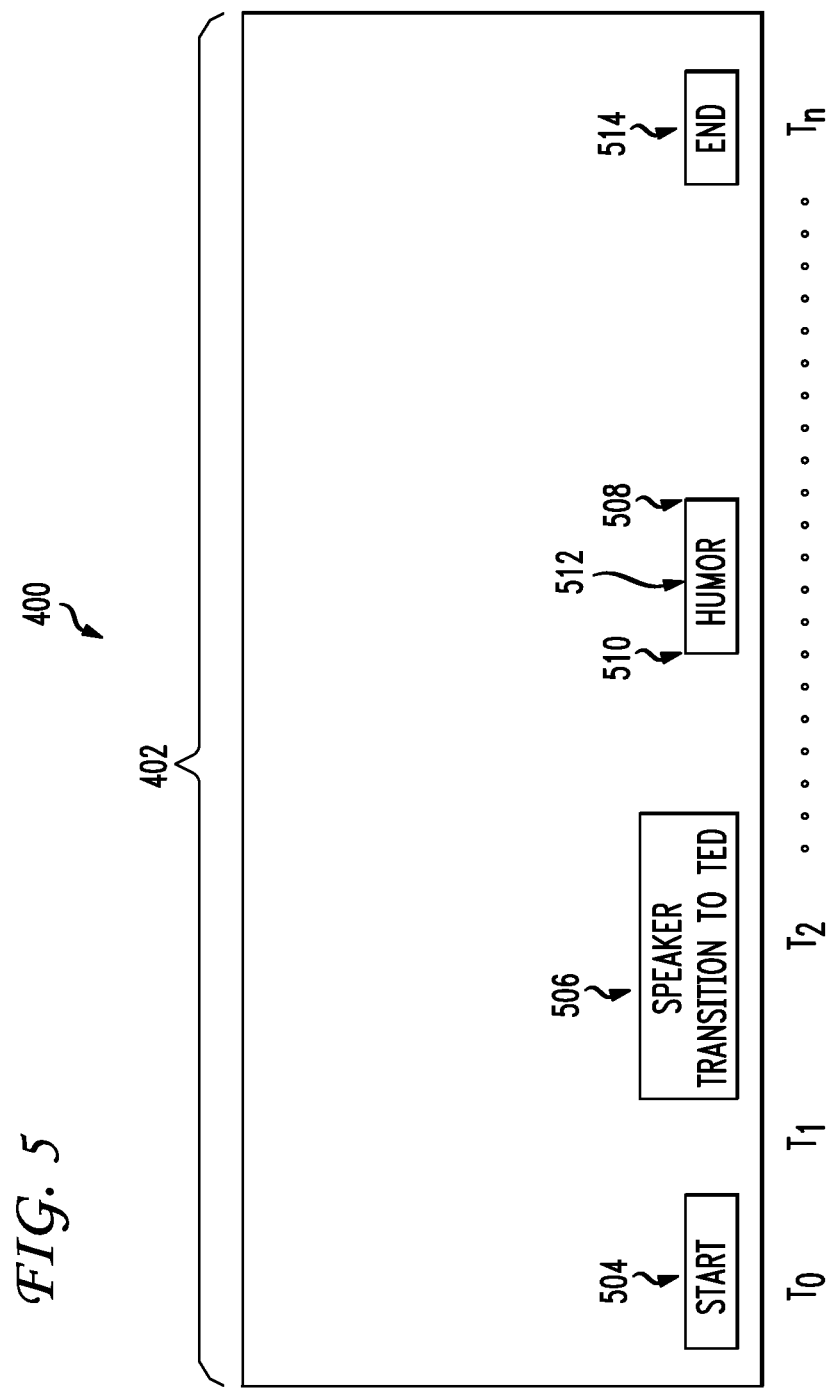
FIG. 5 illustrates the example media event of FIG. 4 with aggregate tags in place of the tags from multiple users.

Other tags of different types can appear as well. For example, during or around the first set of tags, users can provide other types of tags. However, if these tags are not of a similar type or content, then they are not included in the type "speaker transition" for example, even though they are temporally similar. FIG. 5 illustrates one approach for aggregating the tags 404, 406, 408, 410, 414, 414 shown in FIG. 4.

FIG. 5 illustrates the example media event 402 of FIG. 4 with aggregate tags in place of the tags from multiple users. The aggregate tags can replace all or some of the source tags or the aggregate tags can exist alongside the source tags. In this example, the aggregate tag "start" 504 replaces the first set of tags 404. The aggregate tag "start" 504 is the same as the tag type for the first set of tags 404. The aggregate tag "speaker transition to Ted" 506 replaces the second set of tags 406. The aggregate tag "speaker transition to Ted" 506 includes the tag type of the second set of tags 406, and can provides additional information based on information contained in the second set of tags 406 or metadata associated with the second set of tags 406. The aggregate tag "humor" 508 replaces the third set of tags 408 and the outlier tag 410. In this case, the aggregate tag "humor" 508 can be associated with a starting point 510 and an ending point 512 based on the temporal spread between the source tags 408, 410. In this example, the system does not provide an aggregate tag for the tag "what?" 412 because it does not meet an aggregation threshold. However, the system provides an aggregate tag "end" 514 corresponding to the automatically generated "end" tag 414 in FIG. 4. The aggregation threshold can include exceptions or the other rules can override the threshold. For example, the system can include a rule that requires an aggregate tag for certain types of tags (such as an "end" type) or for tags from certain sources (such as an automatic tagger).

Aggregate tags can represent tags of multiple types. For example, if the media event is a baseball game, one tag of type "pitch" and another tag of type "foul ball" can be included in an aggregate tag having a type "first play in sixth inning".

Figure 6:
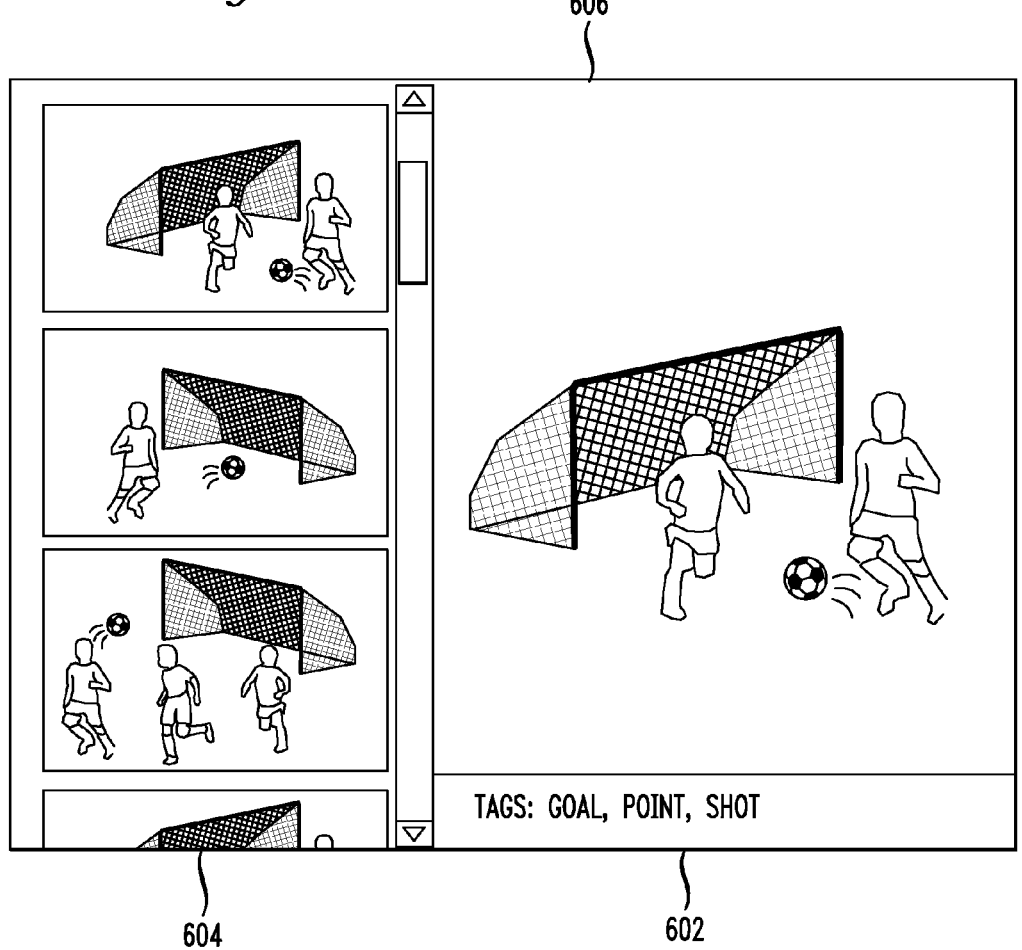
FIG. 6 illustrates an example playback of a media event based on aggregate tags.

FIG. 6 illustrates an example playback 600 of a media event based on aggregate tags. In this example, the media event is a soccer game, but the media event can include a group of individual media events. In one embodiment, a user searches for a particular tag or a type of tag. The user can search for "goals" or for "shots by Jared Borgetti". The system assembles a set of recorded clips from the media event, which may be non-contiguous, filtered based on tags that satisfy the search parameters. The system can display a series of thumbnails 604 representing the recorded clips. The system displays the recorded clips of the soccer game continuously or back-to-back in a main display area 606 and displays tags 602 associated with each displayed portion. The display of tags 602 can also include an indication of how or which tags 602 satisfied the user query. The system 100 can use a clustering algorithm to enable multi-faceted search and aggregation of tagged events and/or portions of tagged events. For example, a user query or search can include multiple facets or parameters, such as a date or time range, particular key words, particular types of taggers, and so forth. The system can analyze the source tags based on the faceted user query to limit the source tags to those that satisfy the query and generate new aggregate tags based on the limited number of source tags. In another variation, the system 100 does not generate new aggregate tags, but refines existing aggregate tags or provides an indication of how closely one or more aggregate tags satisfy the faceted user query.

One benefit of these approaches is that the system can string together non-contiguous segments of rich media based on live-tagging activity. Aggregation policies enable the system to receive live tagging activity, process data, and present aggregated tags based exclusively on the aggregation policies rather than based on content or similarity of content of the tags or number of times the tag or a similar tag is received. In one aspect, these aggregation policies are tied more closely to the rich media content rather than just data associated with the tags themselves. Further, the system can string or tie together non-contiguous segments of the rich media based on the tagging events. Users can review similar portions of a media event, such as "all slide transitions" or "portions where Bryan spoke", based on the tagging activity and associated aggregation policies.

Tags can explicitly represent non-contiguous segments with multiple beginning and end points. Users can skip through time-stamped media based on the tags. Thus, a user can skip directly to portions of the media tagged as "Sam's argument" to see only those parts of the episode of Law & Order where Sam is arguing his case, and leaving out all the other cuts, flashbacks, parts of the story. In one example, the user at the end of the program can provide such a tag stating "great arguments!" which the system then applies to each part of the episode where Sam was arguing the case. In this regard, the system can automatically apply one tag to various contiguous or non-contiguous segments of the program. The user can select the type of tag manually or the system can present options based on an analysis of the program. If the system knows that Sam has periodically been shown in the program during court, the system can present an option to the user to "tag all Sam court events with this tag".

Figure 7:
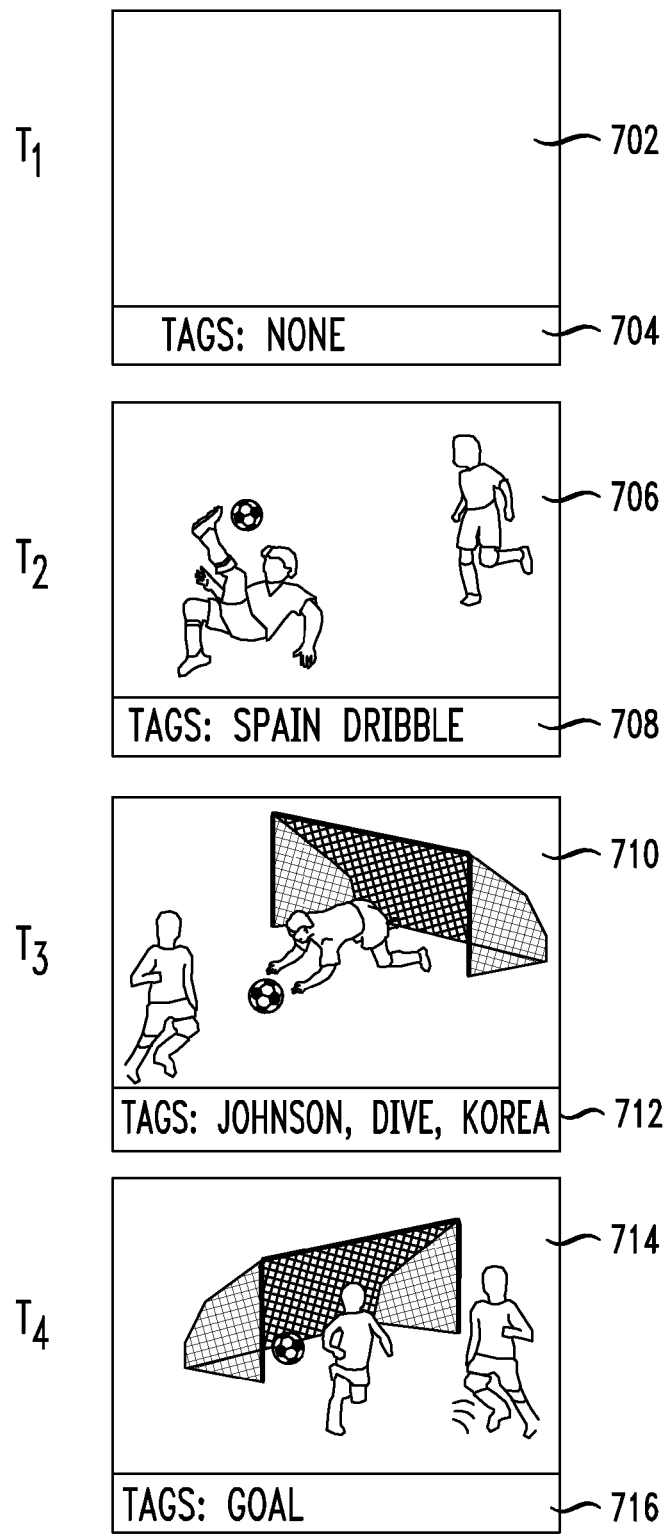
FIG. 7 illustrates an example output of summary tags in real time with a live media event.

FIG. 7 illustrates an example output of summary tags in real time with a live media event. At time $T_1$, the first portion 702 of the live media event does not have any tags 704 to display yet because the live media event just started and users have not begun submitting tags. At time $T_2$, the second portion 706 of the live media event has two tags, "Spain" and "dribble" 708. The system aggregates user-submitted and/or automatically generated tags and displays the aggregated tags alongside the live media event in real time. The aggregated tags 708 can include indications of their source tags. For example, the system can display aggregated tags 708 using different size, color, font, shape, orientation, animation, texture, position, duration, and so forth. For example, the system can display aggregated tags using colors from a national flag to indicate which nation produced the majority of the source tags. In one aspect, an aggregated tag moves on screen to follow a particular object in the live media event with which the aggregated tag is associated. For example, if an aggregate tag is associated with an action by a particular player on the soccer field, the system can move the aggregate tag on the display so the tag appears over the head of that player.

As users submit additional tags during the live media event, the system can update the tags displayed alongside the live media event. At time $T_3$, the third portion 710 of the live media event includes a different set of tags 712, "Johnson", "dive", "Korea". At time $T_4$, the fourth portion 714 of the live media event includes yet a different set of tags 716 describing the media event, "goal". The system can display the aggregate tags as scrolling text, as text that fades in and fades out at the appropriate times, and using other suitable display approaches. In one aspect, the system displays the aggregate tags on a separate display device from the live media event, such as a smart phone, computer, or remote control. In another aspect, the system publishes the aggregate tags via a Really Simple Syndication (RSS) feed, the web, or other content delivery platform.

Figure 8:
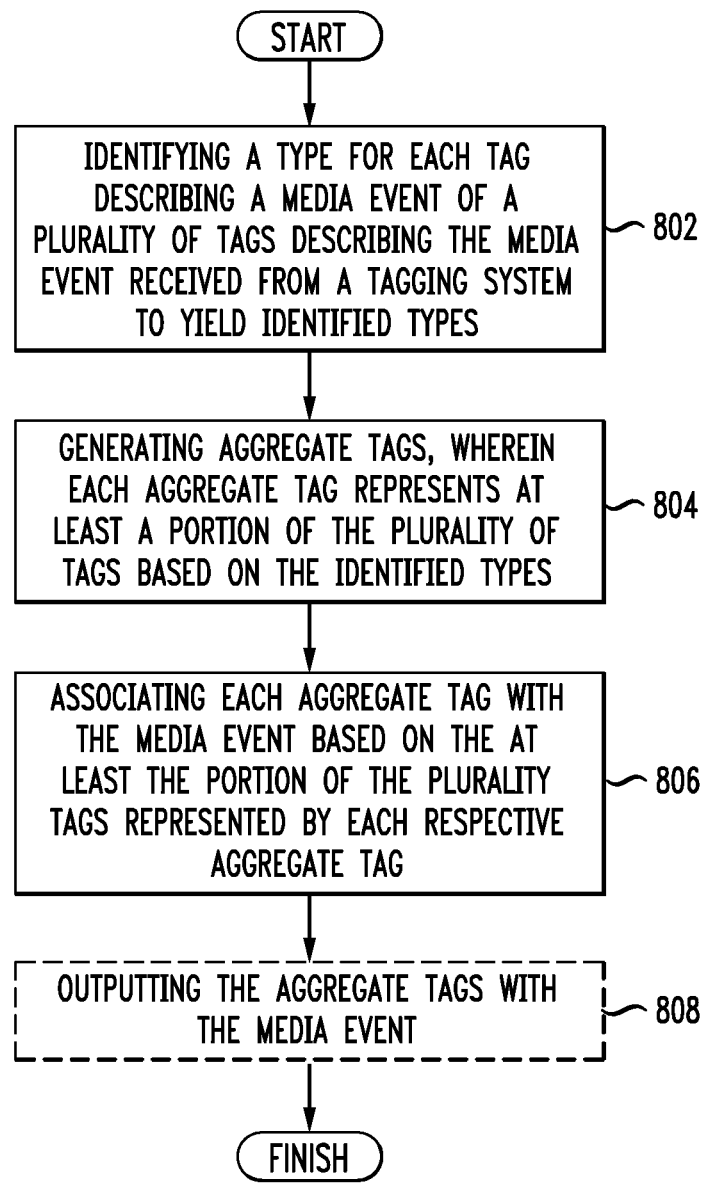
FIG. 8 illustrates an example method embodiment for generating aggregate tags.

Having disclosed some basic system components, tagging concepts, and tagging approaches, the disclosure now turns to the exemplary method embodiments shown in FIGS. 8 and 9. For the sake of clarity, the methods are discussed in terms of an exemplary system 100 as shown in FIG. 1 configured to practice the method.

FIG. 8 illustrates an example method embodiment for generating aggregate tags. The system 100 identifies a type for each tag describing a media event of a group of tags describing the media event received from a tagging system to yield identified types (802). The media event can be real time or recorded. Users or automatic approaches can generate tags in real time, near real time, or in association with playback of a recorded version of the media event. If users generate tags while watching a recorded version of the media event, the system can associate tags with the appropriate time in the media event based on the time the recorded playback began and an offset from that time.

In one aspect, the media event can be multiple different media events, such as completely different media events (such as a sitcom episode and a talk radio show), somewhat related media events (such as a basketball game and a news segment describing the basketball game), or different coverage of a same event (such as coverage of the "State of the Union" address by competing television networks). Thus, the system 100 can aggregate tags or other user interactions across different media events.

In this aspect, the system can correlate otherwise unrelated events. For example, perhaps the sitcom episode and the talk radio show both refer to a particular celebrity. The system can correlate multiple media events based on similar source and/or aggregate tags. Further, the system can determine that an unrelated event (such as news of a rapidly approaching hurricane) causes a large portion of an audience to leave a stadium. The system can show how reaction to news of the hurricane influenced the stadium event's participation. Similarly, this approach can be used to piece together footage where different people heard a sound, such as thunder or lightning.

In one aspect, a tag can have multiple identified types. The system 100 can also receive tag metadata for tags. In this case, the system 100 can identify tag types further based on the tag metadata. The system can look up tag metadata or infer tag metadata from the tag itself, from a human source of the tag, from surrounding tags, or from other suitable and/or relevant information.

The system 100 generates aggregate, or summary, tags, wherein each aggregate tag represents at least a portion of the group of tags based on the identified types (804). The system can generate aggregate tags according to an aggregate tag threshold. A user or automatic process can set the threshold. The threshold can apply to a specific number of tags, a percentage or proportion of tags having a particular trait as compared to the whole, a temporal threshold, a tag similarity threshold, and various combinations thereof. The system can apply multiple thresholds simultaneously or in a particular order when generating aggregate tags.

The system 100 associates each aggregate tag with the media event based on the at least the portion of the group of tags represented by each respective aggregate tag (806). The system can establish a start time and an end time for aggregate tags in relation to the media event based at least in part on the source tags. In this way, a tag can cover the media event not just at a point in time, but over a range in time.

The system 100 optionally outputs the aggregate tags with the media event (808). The system 100 can output the aggregated tags with or without outputting the tags received from the tagging system. The system 100 can also optionally receive user input directed to the aggregate tags and refine output of the aggregate tags based on the user input. In another variation, the system 100 further receives user input associated with one of the aggregate tags, displays additional information about the one of the aggregate tags, such as metadata, related tags, or related portions of the media event or other media events.

FIG. 9 illustrates an example method embodiment for outputting portions of a media event based on aggregate tags. The system 100 retrieves a group of aggregate tags associated with a media event, wherein each of the group of aggregate tags is associated with a portion of the media event, and wherein the aggregate tags represent tags describing the media event (902) and receives input from a user (904). The input can include an aggregation policy and/or a query. The system 100 can apply the aggregation policy and/or the query to the media event, the tags, the aggregated tags, and/or tag metadata. The system 100 identifies a subset of aggregate tags related to the input (906) and outputs portions of the media event associated with the subset of aggregate tags (908) and can output all or part of the aggregate tags and/or source tags for the aggregate tags. The system 100 can output portions of the media event by combining contiguous or non-contiguous portions of the media event.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are applicable to television or radio broadcasts, teleconferences, Internet-based communication events, meetings, court or legislative proceedings, songs, online videos, and so forth. Those skilled in the art will readily recognize various modifications and changes that may be made to the principles described herein without following the example embodi-

We claim:

1. A method comprising:
   identifying a type for each of a plurality of tags describing segments of a media event to yield identified types;
   generating an aggregate tag, wherein the aggregate tag represents a portion of the plurality of tags based on the identified types;
   associating the aggregate tag with non-contiguous segments of the media event based on the segments of the media event associated with the portion of the plurality of tags, to yield aggregately tagged non-contiguous segments of the media event; and
   combining the aggregately tagged non-contiguous segments of the media event into a contiguous media presentation.

2. The method of claim 1, wherein the aggregate tag is generated according to an aggregate tag threshold.

3. The method of claim 1, wherein the media event is in real time and wherein the plurality of tags are received in one of real time and near real time.

4. The method of claim 1, wherein the media event is a recorded media event.

5. The method of claim 1, wherein part of the plurality of tags comprises manually generated tags.

6. The method of claim 5, wherein the manually generated tags are generated by multiple humans participating in the media event.

7. The method of claim 1, wherein part of the plurality of tags is generated automatically.

8. The method of claim 1, wherein one of the plurality of tags has multiple identified types.

9. The method of claim 1, wherein associating each aggregate tag with the media event further comprises establishing a start time and an end time for each aggregate tag in relation to the media event.

10. A system comprising:
    a processor; and
    a computer-readable storage medium having instructions stored which, when executed by the processor, cause the processor to perform operations comprising:
       identifying a type for each of a plurality of tags describing segments of a media event to yield identified types;
       generating an aggregate tag, wherein the aggregate tag represents a portion of the plurality of tags based on the identified types;
       associating the aggregate tag with non-contiguous segments of the media event based on the segments of the media event associated with the portion of the plurality of tags, to yield aggregately tagged non-contiguous segments of the media event; and
       combining the aggregately tagged non-contiguous segments of the media event into a contiguous media presentation.

11. The system of claim 10, wherein the media event is a recorded media event.

12. The system of claim 10, wherein the computer-readable storage medium has additional instructions stored which result in the operations further comprising:
    receiving user input directed to the aggregate tags; and
    refining an output of the aggregate tags based on the user input.

13. The system of claim 10, wherein the computer-readable storage medium has additional instructions stored which result in the operations further comprising:
    receiving user input associated with one of the aggregate tags; and
    displaying additional information about the one of the aggregate tags.

14. The system of claim 10, wherein the computer-readable storage medium has additional instructions stored which result in the operations further comprising receiving tag metadata.

15. The system of claim 14, wherein the computer-readable storage medium has additional instructions stored which result in the operations further comprising identifying the type for each of the plurality of tags based on the tag metadata.

16. The system of claim 14, wherein part of the tag metadata is inferred.

17. A non-transitory computer-readable storage medium having instructions stored which, when executed by a processor, cause the processor to perform operations comprising:
    identifying a type for each of a plurality of tags describing segments of a media event, to yield identified types;
    generating an aggregate tag, wherein the aggregate tag represents a portion of the plurality of tags based on the identified types;
    associating the aggregate tag with non-contiguous segments of the media event based on the segments of the media event associated with the portion of the plurality of tags, to yield aggregately tagged non-contiguous segments of the media event; and
    combining the aggregately tagged non-contiguous segments of the media event into a contiguous media presentation.

18. The non-transitory computer-readable storage medium of claim 17, wherein the media event is a recorded media event.

19. The non-transitory computer-readable storage medium of claim 17, the non-transitory computer-readable storage medium having additional instructions stored which result in the operations comprising receiving input from the user, wherein the input is an aggregation policy.

* * * * *